United States Patent
Löhken et al.

(10) Patent No.: US 10,875,423 B2
(45) Date of Patent: Dec. 29, 2020

(54) ROTATIONAL DAMPER AND SEATING ARRANGEMENT

(71) Applicant: Stabilus GmbH, Koblenz (DE)

(72) Inventors: Lars Löhken, Linz am Rhein (DE); Markus Müller, Koblenz (DE); Raphael Piroth, Koblenz (DE); Ulrich Probst, Hillscheid (DE)

(73) Assignee: Stabilus GmbH, Koblenz (DE)

( * ) Notice: Subject to any disclaimer, the term of this patent is extended or adjusted under 35 U.S.C. 154(b) by 0 days.

(21) Appl. No.: 16/121,769

(22) Filed: Sep. 5, 2018

(65) Prior Publication Data

US 2019/0070978 A1 Mar. 7, 2019

(30) Foreign Application Priority Data

Sep. 7, 2017 (DE) .................. 10 2017 215 830

(51) Int. Cl.
*F16F 9/14* (2006.01)
*B60N 2/02* (2006.01)
(Continued)

(52) U.S. Cl.
CPC .............. *B60N 2/028* (2013.01); *B60N 2/20* (2013.01); *B60N 2/36* (2013.01); *F16F 9/145* (2013.01);
(Continued)

(58) Field of Classification Search
CPC ... B60N 2/028; F16F 9/20; F16F 9/145; F16F 9/585; F16F 9/14; F16F 9/34; F16F 9/44; E06B 9/28
(Continued)

(56) References Cited

U.S. PATENT DOCUMENTS

| 871,329 A | 11/1907 | Dutrieux |
| 1,983,259 A * | 12/1934 | Weiland ................ F16F 9/0472 |
| | | 267/35 |

(Continued)

FOREIGN PATENT DOCUMENTS

| CN | 1389655 | 1/2003 |
| CN | 1675482 | 9/2005 |

(Continued)

OTHER PUBLICATIONS

Extended European Search Report of EP18192670 dated May 22, 2019, 20 pages.
(Continued)

*Primary Examiner* — Christopher P Schwartz
(74) *Attorney, Agent, or Firm* — Rankin, Hill & Clark LLP

(57) ABSTRACT

The present invention relates to, among other things, a rotational damper comprising a fluid-filled damper housing and within the damper housing a piston rotatably accommodated by a rotation axis of the rotational damper in a first direction and an opposite second direction with a piston rod extending in the direction of the rotation axis; whereby the piston has at least one opening with a flow cross-section which allows for the flow of fluid through the piston, whereby a total flow cross-section is calculated as the sum of the flow cross-sections of the at least one opening. A blocking device can be furthermore assigned to the piston which is capable of reducing the flow cross-section of at least one of the openings during a rotation of the piston in a first direction relative to a rotation of the piston in the second direction.

16 Claims, 3 Drawing Sheets

(51) Int. Cl.
  *F16F 9/516* (2006.01)
  *F16F 9/346* (2006.01)
  *B60N 2/36* (2006.01)
  *F16F 9/52* (2006.01)
  *B60N 2/20* (2006.01)
  *F16F 9/20* (2006.01)

(52) U.S. Cl.
  CPC ............... *F16F 9/20* (2013.01); *F16F 9/3465* (2013.01); *F16F 9/516* (2013.01); *F16F 9/52* (2013.01)

(58) Field of Classification Search
  USPC .................................................. 188/290–296
  See application file for complete search history.

(56) References Cited

U.S. PATENT DOCUMENTS

| | | | |
|---|---|---|---|
| 2,036,955 A | 4/1936 | Padgett | |
| 4,768,630 A | 9/1988 | Aubry et al. | |
| 4,938,322 A * | 7/1990 | Sugasawara | F16F 9/103 16/51 |
| 6,308,942 B1 * | 10/2001 | Ersoy | F16F 13/18 267/140.13 |
| 6,725,984 B2 * | 4/2004 | Orita | E05F 5/10 188/290 |
| 7,175,008 B2 * | 2/2007 | Bassi | F16F 9/145 188/290 |
| 7,204,353 B2 * | 4/2007 | Kanno | F16F 9/145 188/290 |
| 7,231,867 B2 * | 6/2007 | Mishima | B62K 21/08 188/306 |
| 7,275,626 B2 * | 10/2007 | Fukuzawa | A47K 13/12 16/54 |
| 2005/0006189 A1 | 1/2005 | Kanno et al. | |
| 2010/0164262 A1 | 7/2010 | Okimura | |
| 2011/0121622 A1 | 5/2011 | Okimura et al. | |
| 2020/0018374 A1 * | 1/2020 | Kaneko | F16F 9/14 |

FOREIGN PATENT DOCUMENTS

| | | |
|---|---|---|
| CN | 101067430 | 11/2007 |
| CN | 102016346 | 4/2011 |
| EP | 1467013 | 10/2004 |
| JP | H03-286084 | 12/1991 |
| JP | H07-229531 | 8/1995 |
| JP | 2004003584 | 1/2004 |
| JP | 2008094148 | 4/2008 |
| JP | 2011033058 | 2/2011 |
| KR | 20140120727 | 10/2014 |
| WO | 2003056121 | 7/2003 |

OTHER PUBLICATIONS

German Search Report for German application No. 10 2017 215 830.1, dated May 7, 2018; 7 pages.
Extended European Search Report for European patent application No. 18192670.0, dated Feb. 18, 2019, 15 pages.
English translation of Chinese Office Action for Chinese application No. 201811041910.9 dated Mar. 4, 2020, 9 pages.

* cited by examiner

ROTATIONAL DAMPER AND SEATING ARRANGEMENT

The present invention relates to improvements on rotational dampers as well as seating arrangements for vehicles.

According to a first aspect, the present invention relates to a rotational damper comprising a fluid-filled damper housing and, within the damper housing, a piston rotatably accommodated by a rotation axis of the rotational damper in a first direction and an opposite second direction with a piston rod extending in the direction of the rotation axis, whereby the piston has at least one opening with a flow cross-section, which allows for the flow of fluid through the piston, whereby a total flow cross-section is calculated as the sum of the flow cross-sections of the at least one opening.

These kinds of rotational dampers are used in many applications in which a rotation movement of two components against each other is to be dampened and whereby, accordingly, the damper housing is arranged to one of the two components while the piston rod is arranged to the other of the two components. The piston rod can hereby extend beyond one or both sides of the damper housing, be formed as a hollow shaft that permits an engagement of an external element, or, for example, have an inner thread or inner profile for such an engagement at its end. Furthermore, the damping hardness, i.e., the damping force that counteracts a rotation movement between the two components, can be adjusted in different ways, for example by the selection of the fluid provided in the damper housing. Here, an increased viscosity of the fluid leads to higher damping as well.

In particular when the fluid provided in the damper housing is a liquid which, as such, is incompressible, the flow-around and/or the flow-through cross-section of the piston is of critical importance as well, because a flow of the fluid around the piston or through it that is made easier by a larger flow-around and/or flow cross-section of the piston makes a displacement of the fluid from one of the two chambers formed by the piston and the damper housing in the respective other chamber easier and therefore ensures a decreased damping hardness relative to a rotation movement.

These types of generic rotational dampers, however, have the same damping hardness at a rotation of the piston in the damper housing in both possible rotation directions, because the flow-around and/or flow-through cross-section of the piston does not depend on the direction of the piston rotation. It may be desired in certain applications to provide a direction-based damping, for example a seating arrangement with a tiltable backrest in a motor vehicle, which will be discussed below.

In this application example, due to an increased damping hardness in the direction of the tilt of the seat's backrest, i.e., in its movement from a substantially vertical position to a substantially horizontal position, a harder damping may be desired, because the weight of the backrest pulls it in the substantially horizontal direction already, while the opposite righting movement of the backrest is to occur under a reduced damping, so that a user must, in addition to the weight of the backrest, overcome a reduced resistance due to the rotational damper.

To solve the stated task of providing a rotational damper with a direction-based damping force, it is proposed that in the rotational damper according to the invention a blocking device be furthermore assigned to the piston which is capable of reducing the flow cross-section of at least one of the openings during a rotation of the piston in a first direction relative to a rotation of the piston in the second direction. This step causes the damping force to be higher due to the reduced flow cross-section during a movement of the piston in the first direction, while the damping force is reduced during a movement of the piston in the second direction due to the greater flow cross-section.

Furthermore, it is clear that even though, according to the invention, a variable flow cross-section is provided in the piston, a flow-through cross-section around the piston may be provided in addition between the piston and the damper housing. This cross-section is still independent of the direction, so that the variable damping force is caused only by the flow cross-section that is dependent of the direction, while the flow-through cross-section for the total flow cross-section must be deemed a constant summand, which is therefore neglected in the description below.

The rotational damper according to the invention may, in particular, be formed so that the total flow cross-section is greater than zero at a rotation of the piston in the first direction. This way, a defined flow cross-section is created with which the damping hardness during rotation in the first direction can be adjusted much more precisely than if only leak flows of the fluid around the piston are possible.

Various variations are conceivable in regard to the configuration of the blocking device in a rotational damper according to the invention. A check valve may be provided in the piston body, for example, that only allows a flow of fluid during a rotation of the piston in one of the two directions of rotation, i.e., that it is arranged in the piston in such a way that it blocks in the first direction during the rotation of the piston, while it opens during the rotation in the second direction. Since, however, a reduced flow cross-section must be present even during the rotation in the first direction to permit the rotation in the first direction at all, either a flow-around cross-section may be provided around the piston at the inside of the damper housing or further openings in the piston which run parallel to the check valve but are always open.

In a particularly easy and therefore preferred embodiment, the blocking device may be formed by at least one elastic plate which is assigned to the piston in such a way that it at least partially covers at least one of the openings during a rotation of the piston in the first direction and substantially exposes the at least one opening during a rotation in the second direction. Hereby, the dynamic flow pressure of the fluid ensures that the elastic plate is pressed against the piston body during the rotation in the first direction and that at least one of the openings is covered at least partially, while during a rotation in the second direction, the elastic plate undergoes an elastic deformation away from the piston body and therefore exposes at least the otherwise covered opening, so that it can contribute to the overall flow cross-section during a rotation in the second direction. The elastic plate may be attached to the piston body for example by means of a rivet and consist of a thin metal sheet with a suitably chosen elasticity.

In a further development, the elastic plate may also comprise at least one opening which overlaps at least partially with one of the openings in the piston during the rotation of the piston in the first direction. By providing the at least one opening in the elastic plate, it is possible to ensure that the at least one opening covered by the plate during the rotation in the first direction can contribute to the overall flow cross-section even during a rotation in the first direction, albeit with a decreased cross-section compared to a rotation in the second direction, because in this case, no longer the total cross-section of the opening in the piston is available for a flow-through by the fluid, but only the flow cross-section defined by the opening in the plate. Since it is easier to drill holes into the elastic plate (or even to punch it) than into the comparatively massive piston body, this way, a variable flow cross-section can be created by simply providing an opening in the piston body and another opening in the plate without further openings having to be provided on the piston body that cannot be covered by the plate even during the rotation in the first direction.

Additionally or alternatively, it may be desired that a generic rotational damper has damping properties that depend on the current rotation angle between the fluid-filled damper housing and the piston accommodated in it. For this purpose as well, a seating arrangement for a vehicle can be conceived as an application in which a backrest is to be tiltable. Since, as such a tilting process advances, the weight of the backrest has an increasing component as it approaches its horizontal orientation, which acts vertically downward and therefore in the direction of the tilting process, it may be desired in order to counteract this increasing component of the backrest's weight, at the same time the damping force acting on the rotational damper provided between the seat and the backrest increases as well, to offer a user increased comfort when operating the backrest through a substantially even-occurring tilting movement. This applies similarly to seating arrangements in vehicles in which the seat itself is arranged rotatably relative to the vehicle in which, for example, it can tilt forward to move the entire seat to a stored position.

To solve this task, a second aspect of the present invention proposes a rotational damper that comprises a fluid-filled damper housing and, within the damper housing, a piston rotatably accommodated by a rotation axis of the rotational damper in a first direction and an opposite second direction with a piston rod extending in the direction of the rotation axis, that, if applicable, comprises additional features of a rotational damper according to the first aspect of the invention, and that is furthermore configured so that at least one bypass channel is provided at the inside of the damper housing across at least a rotation angle section which allows in the area of its extension a flow around the piston by the fluid in the direction against the rotation of the piston.

In providing in this manner at least a bypass channel for the piston in a particular section, an additional flow-through cross-section is provided in the corresponding relative angle positions between the damper housing and the piston in which the piston is located in the area of the at least one bypass channel, which reduces the damping power in this angle area. Therefore, alternatively or additionally to the provision of a damping that depends on the direction of rotation, a damping can be achieved that depends on the rotation angle.

In an exemplary embodiment, the at least one bypass channel can be provided in a plate which substantially extends vertically to the rotation axis, for example a floor of the damper housing. Here, a plate is conceivable, for example, that is provided as an insert and that is inserted into the inside of the damper housing. If the at least one bypass channel is, however, provided directly in the floor of the housing, it may, for example, be milled into the same.

On the other hand, the at least one bypass channel could obviously be provided at an inner peripheral surface of the damper housing, whereby such a configuration may, however, require more extensive work on the damper housing because its interior walls are not equally accessible as a floor of the damper housing.

The at least one bypass channel may, in consideration of the specific application for which the rotational damper according to the invention is provided, basically have any configuration. For example, a different number of identically designed bypass channels may be provided in different angle areas so that one or more switching angle points are defined where the damping hardness of the rotational damper changes when they are reached. In a particularly simple embodiment, the at least one bypass channel may comprise a variable cross-section in the circumference direction, for example a linearly increasing cross-section. This way, a progressive damping behavior of the rotational damper according to the invention can be achieved, whereby the damping of the rotational damper becomes increasingly harder during a movement of the piston relative to the increasing cross-section.

According to a third aspect, the present invention relates to a rotational damper comprising a fluid-filled damper housing and, within the damper housing, a piston rotatably accommodated by a rotation axis of the rotational damper in a first direction and an opposite second direction with a piston rod extending in the direction of the rotation axis which may comprise additional features of a rotational damper according to the first and/or second aspect of the invention and in which, furthermore, a floor is provided within the damper housing that is movable along the axis of rotation.

Such a movable floor that delimits the fluid-filled interior of the rotational damper on one side constitutes a further development of a known rotational damper that can fulfill two tasks. In both cases, however, it is understood that the movable floor must be sealed relative to the inner wall of the damper housing and relative to the piston rod so that the fluid received in the damper housing cannot flow around the floor, but that the floor defines a tightly closed volume in which both the damping fluid and the piston can be accommodated.

The movable floor according to the invention may, on the one hand, serve as an overload safety with which damage to the rotational damper can be avoided if an overly strong moment of force acts on it from the outside. To this purpose, the movable floor may be preloaded by means of an elastic member, for example a mechanical spring, and in particular a disk spring, in the direction of the piston. If now said overly strong movement of force acts on the rotational damper from the outside, i.e., between the damper housing and the piston rod, the fluid received in the damper housing may push the movable floor away from the piston against the effect of the elastic member so that an additional flow-through cross-section is created between the piston and the floor. This way, the damping hardness of the rotational damper decreases, and the piston can move relative to the damper housing with a reduced resistance, so that any damage to the damper is prevented. By suitably selecting the elastic member, for example by selecting a mechanical spring with a respective spring stiffness, it is possible to adjust from what externally applied moment of force the movable floor rises against the effect of the elastic member, because from this moment of force value onward then a regular flow of the fluid through the piston or respectively around the piston is no longer sufficient. This way, it is possible to determine under which conditions the overload safety provided by the floor is deployed.

Even though the movable floor in the preloaded position relative to the piston may be located at a distance from the same, for example, in that it abuts against the contact surfaces provided at the inner wall of the housing, therefore providing a certain flow-through cross-section around the piston at any point in time, an axial sealing member may, on the other hand, be assigned to the piston, whereby the movable floor abuts against the axial sealing member due to the effect of the elastic member. In this way, a flow-through around the piston is prevented on the side of the movable floor in the state in which the movable floor is preloaded against the piston.

A further partial aspect of a movable floor within the damper housing along the axis of rotation, which may be provided together with or alternatively to the overload safety just described, is that the rotational damper may comprise a thermal expansion member which is configured and arranged in such a way that it moves the movable floor further in the direction of the piston as the temperature rises. To this purpose, expansion waxes that are known, for example from thermostats, may be used. They undergo an expansion as the temperature rises and, in this way, move the movable floor closer in the direction of the piston. This measure can ensure that the viscosity of many damping fluids that decreases as the temperature rises, such a hydraulic oil, for example, is counteracted by decreasing the flow-through cross-section for the piston provided between the piston and the movable floor. This way, it is possible to achieve substantially equal damping properties with such a rotational damper across a wide temperature range without having to perform time-consuming measures or having to use special temperature-insensitive damping fluids.

In connection with the movable floor provided as an overload safety, general protection is sought for a rotational damper comprising a fluid-filled damper housing and within the damper housing, a piston rotatably accommodated by a rotation axis of the rotational damper in a first direction and an opposite, second direction with a piston rod extending in the direction of the rotation axis, as well as an overload safety, which makes it possible for fluid to flow around the piston in the event of an overly strong moment of force acting on the same from the outside. Here, in addition to the movable floor already described, it may also be conceivable to provide seals between the piston and the housing which mechanically relent when a moment of force threshold is exceeded and that lose their sealing properties so that in this case it is possible for fluid to flow around the piston.

In a rotational damper of the first to third aspect of the present invention, it may be advantageous when the piston is configured point symmetrically or rotation symmetrically in regard to the axis of rotation. This way, the shearing moments acting on the piston rod can be balanced or absorbed and the forces acting on the piston around the piston rod are equalized.

Furthermore, it may be advantageous in all of the rotational dampers described so far if at least one stop is provided at the inner wall of the damper housing which limits a rotation of the piston at a predetermined angle position. This way, a maximum rotation angle area is defined at which the relative rotation between the damper housing and the piston and/or the piston rod may take place. If no such stops are provided, the damper housing and the piston rod may initially rotate endlessly against each other in both rotational directions in such a damper, which, in some applications, would be quite desirable, or, alternatively, external stops may be provided, for example at the components rotatably positioned against each other across the rotational damper.

Furthermore, at least one sealing member between the piston and the inner wall of the damper housing may be provided in all rotational dampers described. The provision of such a sealing member will prevent fluid from flowing around the piston as well at the respective position, i.e., at at least one radial outer end of the piston between said piston and the inner wall of the damper housing. Through this measure, a shearing force acting on the piston may be stabilized at this position on the damper housing so that this measure contributes to the resistance and durability of the corresponding rotational damper as well.

For similar reasons, another measure that could be performed by any of the rotational dampers described is that its piston comprises a substantially circular hub area in the area of the rotation axis, from which at least one wing area extends in the direction of the inner wall of the damper housing, whereby, furthermore, at least one protrusion extends in the direction of the hub area from the inner wall of the damper housing, whereby a gap ring is preferably provided between the protrusion and the hub area.

In a similar manner as the seals provided at the axial outer ends of the piston between the piston and the inner wall of the housing, the seals provided at the protrusions of the damper housing may, on the one hand, prevent flow around the piston, and on the other, the hub area of the piston may be stabilized at this position relative to the damper housing. It must be noted, however, that protrusions extending over the inner wall of the housing in the direction of the rotation axis always constitute a limitation of the possible rotation angle because the piston unavoidably abuts against the damper housing with its wing areas in certain angle positions. Consequently, this measure is only suitable for rotational dampers in which an angle stop is to be provided anyway, whereby, if applicable, the projections may also serve as stops and therefore perform both functions stated.

As already indicated, the present invention according to a fourth aspect relates to a seating arrangement with a seat and a backrest for a vehicle, whereby the seat is rotatable from its horizontal position relative to the vehicle and/or the backrest, tiltable from a substantially horizontal position to a substantially vertical position, whereby a rotational damper according to the invention is provided between the seat and the vehicle and/or between the seat and the tiltable backrest, whereby one of the damper housings and the piston rod are assigned to the seat and the other of the two to the backrest and/or the vehicle.

Furthermore, the present invention provides a seating arrangement with a fixed seat and a tiltable backrest for a vehicle in which a damper is provided between the fixed seat and the tiltable backrest which, when the backrest is tilted from the substantially vertical position to the substantially horizontal position, has a greater damping force than during an opposite movement of the backrest. This way, when the backrest is tilted down or up, the advantage exists that the weight of the backrest is counteracted due to the increased damping during the downward tilt to prevent an uncontrolled falling down of the backrest. On the other hand, however, it is made easier for a user to raise the backrest up again in the opposite direction in which he works without the weight of the backrest anyway. It should be noted that, even though in the seating arrangement just described a rotational damper according to the first aspect of the invention may be used, this does not have to be the case, but, for example, a linear damper with damping properties that depend on the direction may be used as well, which is to be provided together with a deflection device, which converts the movement of rotation of the backrest relative to the seat into a linear movement of the linear damper.

It may furthermore be desirable if, in such a seating arrangement, the damper has an increasing damping force when the backrest is moved from the substantially vertical position to the substantially horizontal position so that the increasing vertically acting components of the backrest's weight during a transition from the vertical to the horizontal are balanced by harder damping properties of the damper in these angle positions. This damping property may, on the one hand, be achieved by using a rotational damper which, in addition to the properties of the first aspect of the invention, comprises properties of the second aspect of the invention as well or, on the other hand, a linear damper with the stated properties in a similar manner as mentioned above.

By suitably adapting the direction- and angle-dependent damping properties of such a rotational damper or respectively a linear damper deflection device assembly to the weight of the backrest for a tiltable connection between the fixed seat and the backrest, it is possible that a substantially constant force must be applied during a tilting of the backrest from the substantially vertical position to the substantially horizontal position.

Further properties and advantages of the present invention become clear from the description of embodiments below when these are considered together with the enclosed figures. These figures show in detail:

Figure 1:
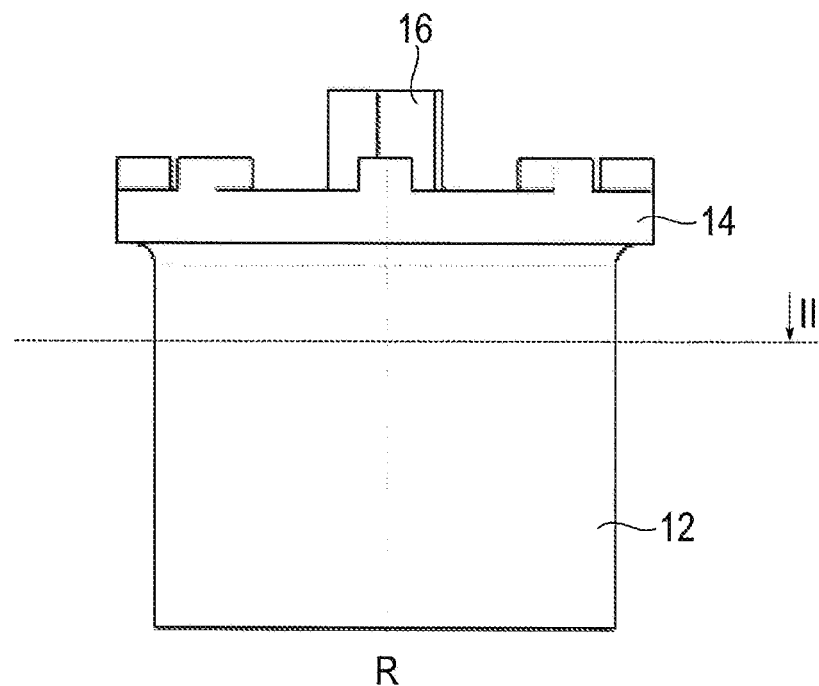
FIG. 1 shows a rotational damper according to the invention in the mounted state from the outside in a side view.

FIG. 1 shows a rotational damper according to the invention in the mounted state in a side view, which is identified in general with the reference number 10. It comprises a cylindrical damper housing 12 with an end cap 14 attached to it, which is fastened in the known manner for example by being screwed on or by means of a bayonet closure. A piston rod 16 extends through this end cap 14, whereby sealing members are arranged respectively between the damper housing 12, the end cap 14, and the piston rod 16 so that a tight interior is created in the damper housing 12 in which damping fluid is received.

Figure 2:
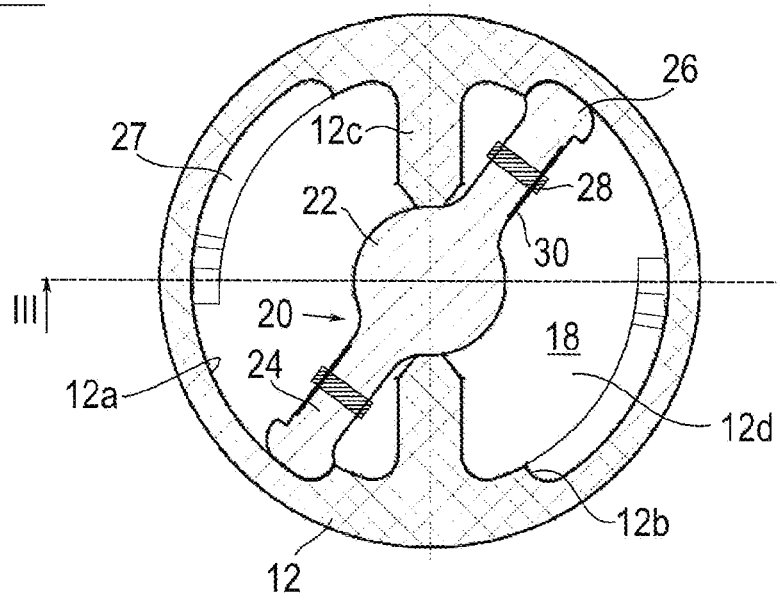
FIG. 2 shows the rotational damper from FIG. 1 in a sectional view along a section plane vertical to its rotational axis.

The damper housing 12 and the end cap 14 attached thereto on the one hand and the piston rod 16 on the other are rotatable against each other by an axis of rotation R, whereby a cut is indicated vertical to this axis of rotation R by the plane II, along which the view from FIG. 2 is shown.

This FIG. 2 shows, in addition to the already mentioned damper housing 12, the interior space 18 provided therein which, as mentioned, is filled with a damping fluid such as hydraulic oil. Furthermore, a piston 20 is arranged in the damper housing 12, which represents an axial extension of the piston rod 16 from FIG. 1. This piston 20 is, just as the damper housing 12, formed point symmetrically around the axis of rotation R and comprises a substantially circular hub area 22, which extends around the axis of rotation R, two wing areas 24 radially extending outward from this hub area 22, as well as two radial ends 26. Between the radial ends 26 of the piston 20 and the inner wall 12a of the damper housing 12, sealing members may be provided that are assigned to the piston 20 so that flow around the piston 20 is prevented at its radial outside.

Furthermore, FIG. 2 shows stops 12b that protrude from the inner wall 12a of the damper housing 12, which restrict the possible rotation angle area between the piston 20 and the damper housing 12, when the piston 20 abuts to the respective stops 12b with its radial outer ends 26, as this is specifically shown in FIG. 2 as well. Even further from the inner wall 12a of the damper housing 12 than the stops 12b extend two protrusions 12c in a symmetrical manner as well until they reach the hub area 22 of the piston 20. Sealing members may be provided between these protrusions 12c and the hub area 22 of the piston 20 so that, on the one hand, flow around the piston 20 is prevented in this area and, on the other, that a transfer of the shearing forces acting on the piston 20 to the damper housing 12 are permitted at this location.

It should be pointed out in this context that, even though the protrusions 12c could perform the function of the stops 12b as well, the angle distance between the protrusions 12c and the stops 12b shown in FIG. 2 can avoid nonlinear damping effects which would occur, for example, if large surfaces of the piston 20 were to abut against the protrusions 12c, whereby then a suction effect would occur when the piston 20 is detached from the protrusions 12c again.

Furthermore, FIG. 2 shows in the substantially even floor 12d of the damper housing two point-symmetrically configured bypass channels 27 which both extend counterclockwise from one of the projections 12c in the circumference direction with a decreasing cross-section and which facilitate, in the area of their extension, the flow of the damping fluid around the piston 20. These bypass channels 27 achieve a progressively increasing, angle-dependent damping force which increases counterclockwise during a movement of the piston 20 away from the corresponding protrusion 12c.

Lastly, reference should be made in connection with FIG. 2 to the two rivets 28 in the wing areas 24 of the piston 20, which pass through the holes provided in the wing areas 24 and which each retain an elastic plate 30, which extends substantially parallel to the axis of rotation R and therefore parallel to the wing area 24 of the piston 20 in this direction. Furthermore, a cutting line III is shown in FIG. 2 along which the cross-section from FIG. 3 is taken.

Figure 3:
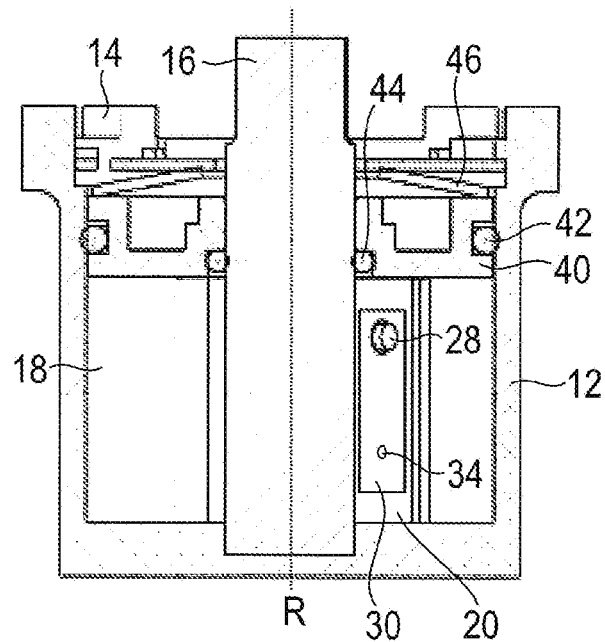
FIG. 3 shows the rotational damper from FIGS. 1 and 2 in a cross-sectional view along a section plane parallel to the rotational axis.

This FIG. 3 shows, in addition to the components damper housing 12, end cap 14, piston rod 16, piston 20, rivet 28, and elastic plate 30 already described above, a floor 40 that is movable in the direction of the axis of rotation R which is sealed from the damper housing 12 as well as the axis of rotation 16 by means of two seals 42 and 44 configured as O-rings, so that no fluid can escape from the inner space 18. Furthermore, an elastic member configured as a disk spring 46 is provided between the movable floor 40 and the end cap 14, which preloads the movable floor 40 in the direction of the piston 20. Here, the assembly formed from the movable floor 40 and the disk spring 46 serve as an overload safety, because the movable floor 40 is raised by the displacement effect of the fluid received in the inner space 18 in the event of an external moment of force acting on the piston rod 16, if the fluid can no longer flow through or around the piston 20 with a sufficient flow rate, whereby the fluid can flow additionally between the piston 20 and the movable floor 40. This way, a bypass of the piston 20 is created so that the damping force of the damper 10 suddenly decreases and the external moment of force can be accommodated in that the piston 20 rotates in the corresponding direction with much less resistance until it abuts against one of the stops 12b.

Figure 4A:
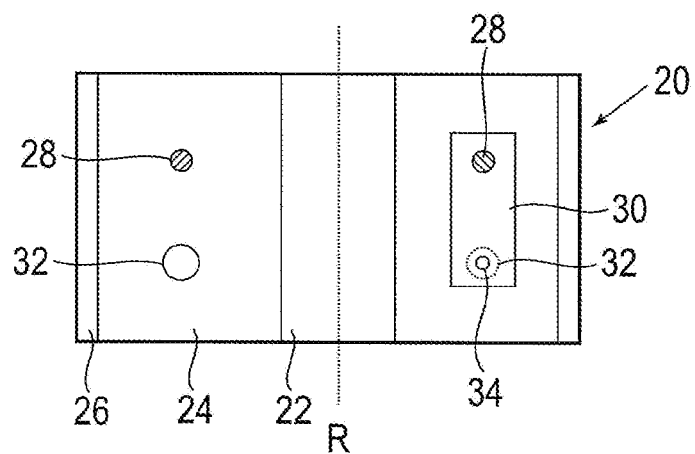
FIGS. 4a and 4b show detail views of possible embodiments of the piston of the rotational damper from FIGS. 1 to 3.
Figure 4B:
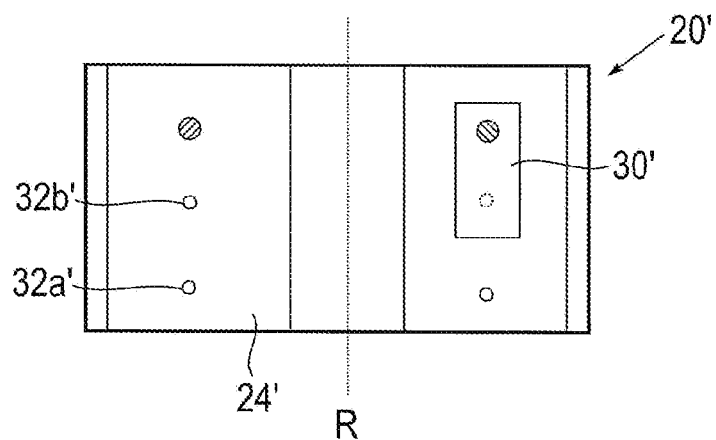

FIGS. 4a and 4b show two variations in which a damping that depends on the direction of rotation can be achieved by the interaction of the piston 20 with the elastic plate 30 and 30'. Here, the two pistons 20 and 20' are each shown from a front view, i.e., in a top view on an elastic plate 30 and 30', whereby a further plate that is not shown is arranged symmetrically on the back of the pistons 20 and 20'.

In the first variation shown in FIG. 4a, a further hole 32 is provided in the two wings 24 of the piston 20 in addition to the hole provided for the rivet 28, through which fluid can flow through the piston 20. These openings 32 are, however, initially covered by the elastic plates 30, which, however, each have an opening 34 with a smaller cross-section and which coincides in FIG. 4a with the opening 32 of the piston. Thus, the fluid can first only have the cross-section of the opening 34 of the elastic plate 30 available to flow through the piston 20, as will later be explained with the help of FIG. 5a as well.

On the other hand, the variation shown in FIG. 4b shows two pairs of openings 32a' and 32b' at the piston wings 24' of the piston 20' whose respective cross-section forms an overall flow-through cross-section for the fluid through the piston 20'. Here as well, however, the elastic plate 30' initially covers one of the two openings, while the other opening 32a' remains exposed in every state and can act as a flow channel through the piston 20'.

Another variation not shown here would be a piston/plate assembly in which all holes of the piston are completely covered by the plate during a rotation in the first direction so that fluid can only flow around the piston in this state. Expressed differently, the flow-through cross-section of the piston in this variation is zero during the rotation in the first direction.

Figure 5A:
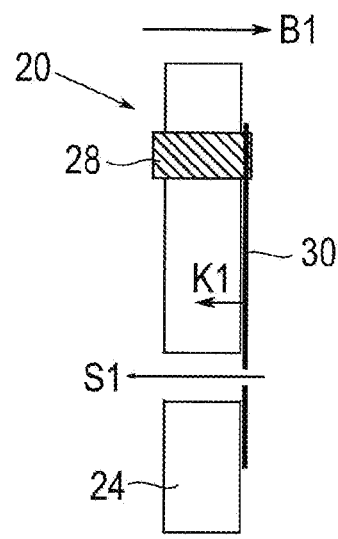
FIGS. 5a and 5b show the piston from FIG. 4a in a sectional view during rotation in opposite directions.
Figure 5B:
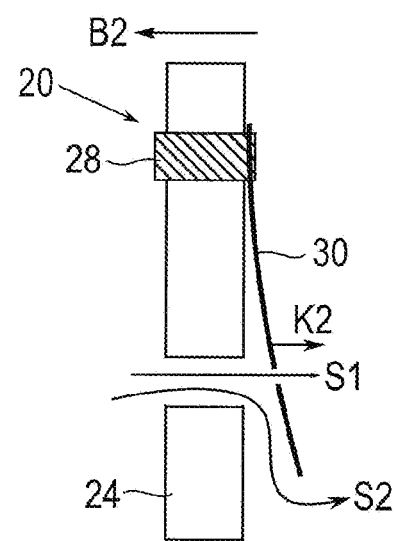

FIGS. 5a and 5b, which actually show the variation from FIG. 4a, whose theory of operation can, however, be easily applied to the variation from FIG. 4b, now show, however, that a lifting of the elastic plate 30 due to the dynamic pressure acting on it causes the available flow cross-section for fluid through the piston 20 to be increased. While during a movement of the piston in direction B1, which corresponds in FIG. 2 to a clockwise rotation, the piston 20 is pressed against the wing area 24 of the piston 20 due to the dynamic pressure K1 of the fluid and therefore only the cross-section of the opening 34 of the elastic plate 30 is available as a flow path S1 for the fluid, the elastic plate 30 is lifted from the wing area 24 of the piston 20 during an opposite movement of the piston 20 in the direction B2 due to the pressure K2 of the fluid, so that, in addition to the flow path S1 through the opening 34 of the elastic plate 30, the second flow path S2 through the opening 32 of the piston 20 and between the piston wing 24 and the plate 30 is available. Consequently, a higher damping force acts during a movement of the piston 20 in the direction of rotation B1 than during a movement in the direction B2, whereby, through a suitable selection of the viscosity of the damping fluid and the cross-sections of the openings 32 and 34, various levels of damping hardness can be adjusted in both directions B1 and B2.

Figure 6:
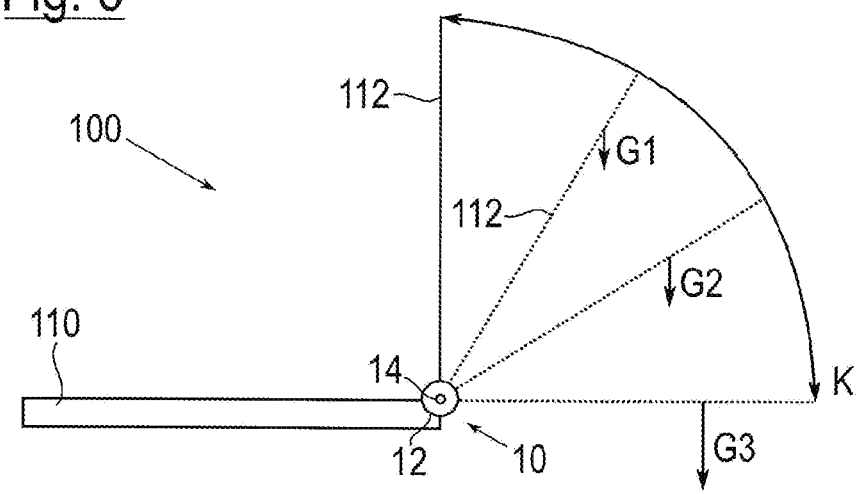
FIG. 6 shows a schematic side view of a seating arrangement according to the invention.

Lastly, FIG. 6 shows a diagram of a seating arrangement according to the invention from a side view, which is identified with the reference number 100 and which comprises a fixed seat 110 and a tiltable backrest 112. These kinds of seating arrangements are used in motor vehicles, for example, to create a continuous loading surface when the seats are not in use, and while, in the case shown, a tilting of the backrest from its substantially vertical position to its substantially horizontal position occurs backward away from the seat, arrangements of this type are known as well in which the backrest 112 can be tilted forward in the direction of the seat 110. Here, the rotatable attachment of the backrest 112 relative to the seat 110 is provided by a rotational damper 10 according to the invention, whereby in this case, the axis of rotation R represents the axis of rotation between the backrest 112 and the seat 110 and the damper housing 12 of the damper 10 is assigned to the backrest 112, while the piston rod 16 is assigned to the seat 110.

During a tilting of the backrest 112 in the direction of the circular arc K, a differently large component applies its weight in the vertical direction, depending on the current angle of the backrest 112, as indicated by the arrows G1, G2, and G3 in three possible positions of the backrest 112. The rotational damper 10 according to the invention makes it now possible that a tilting of the backrest 112 is dampened more than a return of the backrest 112 to the upright position in order to avoid a sudden backward drop of the backrest 112, on the one hand, or to not make it unnecessarily more difficult for a user to bring the backrest 112 again in a vertical position against its weight. On the other hand, the damping progressively increases during a movement from the vertical to the horizontal position to create a compensation for the also increasing vertically acting components of the weight G1-G3. Last but not least, the rotational damper 10 provides an overload safety as well which prevents the damper and other components from being damaged.

The invention claimed is:

1. A rotational damper, comprising:
   a fluid-filled damper housing and
   a piston rotatably accommodated in the damper housing by a rotation axis of the rotational damper in a first direction and an opposite second direction with a piston rod extending in the direction of the rotation axis;
   whereby the piston has at least one opening with a flow cross-section, which allows for the flow of fluid through the piston,
   whereby a total flow cross-section is calculated from the flow cross-section of the at least one opening,
   wherein a blocking device is assigned to the piston, which is capable of reducing the flow cross-section of the at least one opening during a rotation of the piston in a first direction relative to a rotation of the piston in the second direction, and
   wherein at least one bypass channel is provided atformed on the inside of a bottom floor of the damper housing across at least one rotation angle section which facilitates the flow of fluid around the piston in the direction against the rotation of the piston.

2. A seating arrangement with a fixed seat and a tiltable backrest for a vehicle, wherein the damper of claim 1 is provided between the fixed seat and the tiltable backrest which, when the backrest is tilted from the substantially vertical position to the substantially horizontal position, has a greater damping force than during an opposite movement of the backrest, in particular a rotational damper.

3. A seating arrangement according to claim 2, wherein the damper has an increasing damping force when the backrest is tilted from the substantially vertical position in the substantially horizontal position.

4. A seating arrangement according to claim 3, wherein the backrest and the damper are adapted to each other in such a way that a substantially constant force must be applied when the backrest is tilted from the substantially vertical position to the substantially horizontal position.

5. A rotational damper according to claim 1, wherein the blocking device through which at least one elastic plate is formed is assigned to the piston in such a way that it at least partially covers the at least one opening during a rotation of the piston in the first direction and substantially exposes the at least one opening during a rotation in the second direction.

6. A rotational damper according to claim 5, wherein the elastic plate comprises at least one opening which overlaps at least partially with the at least one opening of the piston during the rotation of the piston in the first direction.

7. A rotational damper according to claim 1, wherein the total flow cross-section is greater than zero at a rotation of the piston in the first direction.

8. A rotational damper according to claim 1, wherein the piston is formed point symmetrically or rotation symmetrically relative to the rotation axis.

9. A rotational damper according to claim 1, wherein at least one stop is provided at the inner wall of the damper housing which limits a rotation of the piston at a predetermined angle position.

10. A rotational damper according to claim 1, whereby at least one sealing member is provided between the piston and the inner wall of the damper housing.

11. A rotational damper according to claim 1, wherein the piston comprises a substantially circular hub area in the area of the rotation axis from which at least one wing area extends in the direction of the inner wall of the damper housing, whereby furthermore at least one protrusion extends in the direction of the hub area from the inner wall of the damper housing.

12. A rotational damper according to claim 1 wherein the rotational damper is provided between a seat of a vehicle and the vehicle and/or between the seat and a tiltable backrest of the vehicle, whereby the seat is rotatable from its horizontal position relative to the vehicle and/or the backrest, tiltable from a substantially horizontal position to a substantially vertical position, and whereby one of the damper housings and the piston rod are assigned to the seat and the other of the two to the backrest and/or the vehicle.

13. A rotational damper, comprising:
a fluid-filled damper housing; and
a piston rotatably accommodated in the damper housing by a rotation axis of the rotational damper in a first direction and an opposite second direction with a piston rod extending in the direction of the rotation axis,
wherein at least one bypass channel is provided at the inside of a bottom floor of the damper housing across at least one rotation angle section which facilitates the flow of fluid around the piston in the direction against the rotation of the piston, and
wherein a separate floor is provided within the damper housing that is movable along the rotation axis by displacement of the fluid within the damper housing, the floor being preloaded in an axial direction toward the piston by an elastic member.

14. A rotational damper according to claim 13, wherein the least one bypass channel comprises a variable cross-section in a circumference direction.

15. A rotational damper according to claim 13, wherein an axial sealing member is assigned to the piston, whereby the floor abuts against the axial sealing member due to the effect of the elastic member.

16. A rotational damper according to claim 13, further including a thermal expansion member which is configured and arranged in such a way that it moves the floor further in the direction of the piston as the temperature increases.

* * * * *